United States Patent
Chapman

(10) Patent No.: US 7,181,616 B2
(45) Date of Patent: Feb. 20, 2007

(54) METHOD OF AND APPARATUS FOR DATA TRANSMISSION

(75) Inventor: Diana M. Chapman, Kanata (CA)

(73) Assignee: Nortel Networks Limited, Montreal (CA)

( * ) Notice: Subject to any disclaimer, the term of this patent is extended or adjusted under 35 U.S.C. 154(b) by 878 days.

(21) Appl. No.: 10/012,339

(22) Filed: Dec. 12, 2001

(65) Prior Publication Data

US 2003/0110377 A1 Jun. 12, 2003

(51) Int. Cl.
*H04L 9/00* (2006.01)
(52) U.S. Cl. .................. 713/161; 713/150; 713/151; 713/160; 713/168; 713/181; 713/176
(58) Field of Classification Search ........ 713/160–161, 713/150–151, 168, 181
See application file for complete search history.

(56) References Cited

U.S. PATENT DOCUMENTS

| | | | | |
|---|---|---|---|---|
| 5,103,478 | A * | 4/1992 | Matyas et al. | 380/280 |
| 6,622,251 | B1 * | 9/2003 | Lindskog et al. | 713/300 |
| 6,795,917 | B1 * | 9/2004 | Ylonen | 713/160 |
| 6,839,320 | B2 * | 1/2005 | Paridaens et al. | 370/230 |
| 2001/0034831 | A1 * | 10/2001 | Brustoloni et al. | 713/151 |
| 2002/0035681 | A1 * | 3/2002 | Maturana et al. | 713/151 |
| 2002/0199098 | A1 * | 12/2002 | Davis | 713/160 |
| 2004/0064688 | A1 * | 4/2004 | Jacobs | 713/150 |

OTHER PUBLICATIONS

A Book With Title "Cryptography and Network Security Principles and Practice" second edition by William Stallings, 1998.[ 5 pages].*

* cited by examiner

*Primary Examiner*—Gilberto Barrón, Jr.
*Assistant Examiner*—Samson Lemma

(57) ABSTRACT

A method and apparatus for data transmission between a sending node and a receiving node is provided. The sending node has a transmission executor for sending a decrypted message as a plurality of packets. When the encrypted message includes a message authentication code (MAC), the sending node sets an indicator in the packet that the result of MAC authentication will be sent later. The packet is sent from the sending node to the receiving node in a pipeline mode. The receiving node has buffer, and a preprocessor for preprocessing the payload of the packet. If the operation requested or the preprocessing required by the payload does not require MAC authentication, the requested operation/preprocessing will be executed. Otherwise, the receiving node defers the execution until the corresponding positive notification of MAC authentication is received from the sending node. Handling of negative MAC authentication is policy based at the receiving node.

20 Claims, 1 Drawing Sheet

METHOD OF AND APPARATUS FOR DATA TRANSMISSION

FIELD OF THE INVENTION

The present invention relates to the method of and apparatus for data transmission and is particularly concerned with pipeline mode transmission.

BACKGROUND OF THE INVENTION

Security protocols such as IPSec (Internet Protocol Security), SSL/TLS (Secure sockets Layer/Transport Layer Security) and others use cryptographic functions that are both CPU and memory intensive.

To aggravate the problem, most commercial implementation of cryptographic functions only handle complete Packet Data Units (PDU)—meaning, the receiving end of a flow of cipher text must re-assemble the complete unit of data encrypted by the transmitting end. As a result, latency (which adds to response time) is incurred while the receiving end reconstructs the PDU.

This process, in turns, requires substantial memory for buffering and very significant CPU cycles for ordering fragments, complying with transmission protocol such as TCP and providing intricate buffer management.

As the Internet transforms into the virtual highway for day-to-day applications such as e-mail, e-banking and e-trading, security with minimal cost in performance is becoming a necessity.

SUMMARY OF THE INVENTION

An object of the present invention is to provide an improved method of and apparatus for data transmission.

BRIEF DESCRIPTION OF THE DRAWINGS

The present invention will be further understood from the following detailed description of a preferred embodiment with reference to the drawings, in which:

FIGURE illustrates in a functional block diagram a method of data transmission in accordance with an embodiment of the present invention.

DETAILED DESCRIPTION OF THE PREFERRED EMBODIMENT

Figure 1:
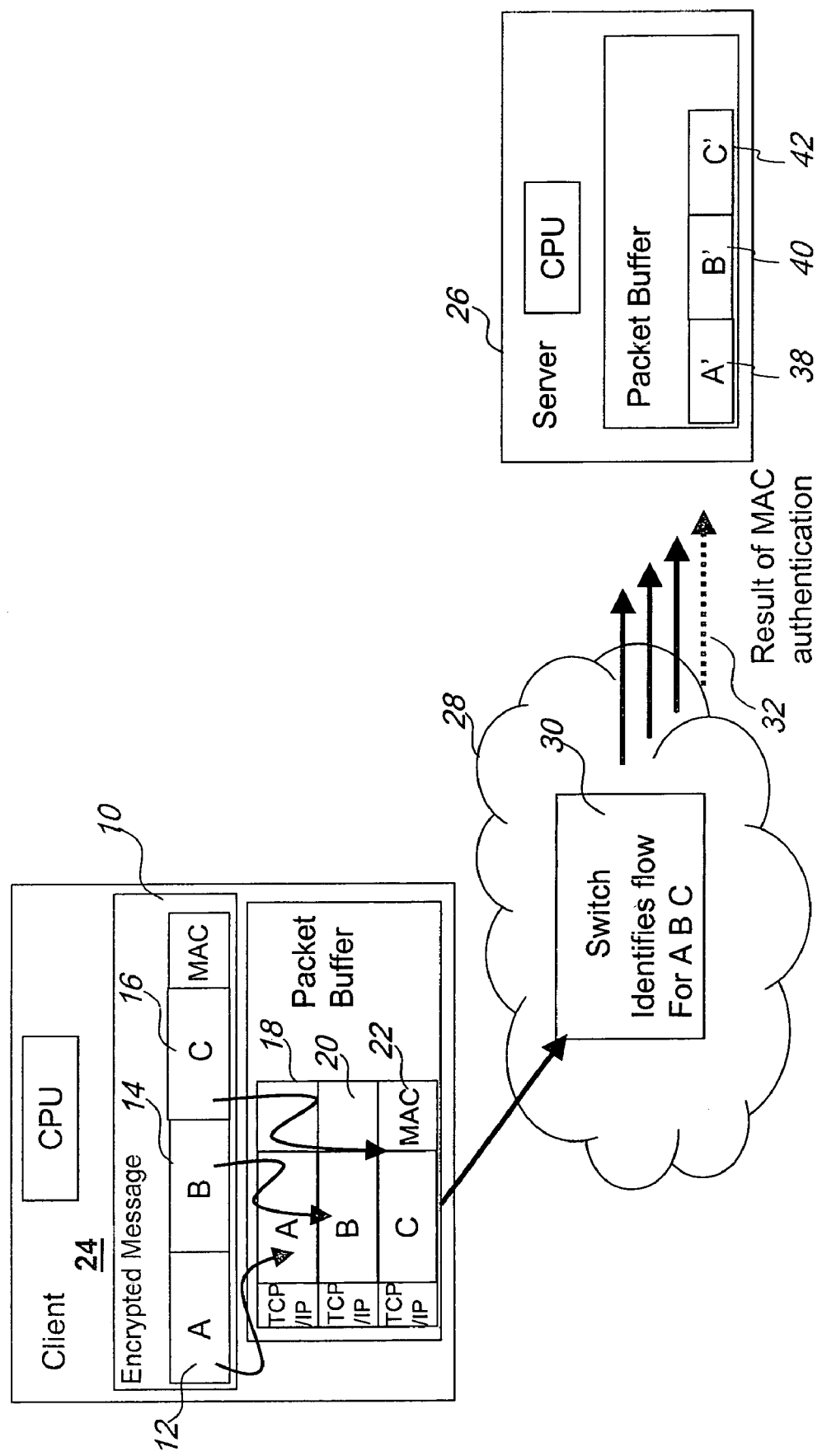

Referring to the FIGURE, there is illustrated in a functional block diagram, a method of data transmission in accordance with an embodiment of the present invention. An encrypted message 10 for a protocol such as Secure Socket Layer (SSL) may become much longer than the packet length supported by the transport layer, consequently the message must be fragmented to fit into the packets, for example the encrypted message 10 is fragmented into sections A, B, and C referenced as 12, 14, and 16, respectively. These sections 12, 14, and 16 are then put into packets 18, 20 and 22, respectively with appropriate headers, for example TCP/IP headers.

A client 24, then sends these packets to a server 26, via switch 30 in network 28. The switch 30, determines the flow with which the packet is associated, performs partial decryption and partial message authentication (handling is dictated by the selected cryptographic algorithms) and forwards the decrypted and partially authenticated segments (38, 40 and 42) to server 26. Via prior configuration, on receiving clear data segments, server 26 performs only portions of the transaction that do not require message (or MAC) authentication. Examples of such portions of transaction are record look up, correlation of records from multiple databases, inventory check, balance check, etc.

As an improvement, an indicator can be inserted into the packets to indicate to the receiving node if there was a MAC in the corresponding encrypted message. Assuming that the customer policy dictates the level of security, (e.g. MAC is mandatory for application X) then, as a short cut, the receiving node can use this indicator to identify operations that require MAC authentication.

When all the segments of the current PDU are received and the MAC is fully authenticated, a notification is sent to server 26. Upon receiving the notification, server 26 executes the transaction(s) that requires message authentication. Examples of such transaction are money transfer, purchases, download of confidential data, etc. For transactions that do not require full MAC authentication (for example, asking for a graphic image on a secured page), server 26 may elect (according to its policy) to proceed without a full MAC authentication.

This approach of explicit notification of message authentication has the following advantages:

1. It allows partial unit handling without security breach, thereby, it saves the memory required for buffering the entire unit of data. This translates to substantially lower cost of goods.

Take SSL, the ubiquitous security protocol for Internet traffic, as an example. The encrypted data are sent in SSL records that can be up to 16K bytes each. If encrypted units must be re-constructed prior to decryption, the buffering requirements will be substantial. In the worst case, this will be (the maximum unit size*the number of simultaneous sessions supported). For example, 100K simultaneous SSL sessions will require 100K*16K=1.6 G bytes of memory If partial unit handling can be done, the memory requirement can be as small as one tenth of the above (e.g. handling can be done as TCP segments are received.)

2. It saves latency and therefore improves response time in that data can be processed as they are received in a pipelined mode instead of a store-and-forward mode. CPU cycles and memory accesses required for buffering and context switching are no longer needed. The end system can easily scale three- to five-fold that of systems operating in the store-and-forward mode. For an end system, this results in higher throughput at lower cost.

3. Since data are sent as they are received, this allows the pre-fetching of a transaction, pre-processing and so on. It makes possible all kinds of pre-processing of a transaction. The list of benefits goes on.

Without explicit notification of MAC authentication, partial unit handling and forwarding breaks the security provided by a Message Authentication Code (MAC) in that a window is now opened to the cryptanalysts. Data can be altered and the change to the message will not be detected until message authentication occurs at the end of the transmit unit. In the case where multiple transactions or operations are sent in a single encrypted PDU, altered transactions can be executed before the complete message is authenticated.

Granted that this is difficult to break, this practice violates the security intent of using a Message Authentication Code.

In other words, if this security hole is allowed to happen then MAC can be broken, which is a protocol violation.

The present embodiment is not limited to any particular protocol. As HTTP over SSL/TLS is becoming a common protocol for secured web based transactions, HTTP over SSL/TLS is used as an example here. The present embodiments can be implemented by adding a special HTTP header or footer to signal that the transmitted data has been fully authenticated.

What is claimed is:

1. A method of providing a data transmission between a sending node and a receiving node via a third node in a network, the method comprising the steps of:
   (1) providing an encrypted message including a message authentication;
   (2) fragmenting the encrypted massage into a plurality of sections;
   (3) forming a plurality of packets for transporting the plurality of the sections, each of the plurality of packets including a flag indicating a presence of the message authentication;
   (4) establishing the data transmission of the plurality of packets between the sending node and the receiving node;
   (5) decrypting a member of the plurality of sections at the third node;
   (6) authenticating the member at the third node;
   (7) sending an explicit notification to the receiving node; and
   (8) forwarding the decrypted and authenticated member of the plurality of sections to the receiving node.

2. The method according to claim 1 further comprising the step of executing a transaction requiring the message authentication upon receiving the explicit notification, at the receiving node.

3. The method according to claim 1 wherein the plurality of packets is sent from the sending node to the receiving node in a pipeline mode.

4. The method according to claim 3 further comprising the step of preprocessing the section in the packet.

5. The method according to claim 4 further comprising the step of buffering the packet of the preprocessing step.

6. The method according to claim 5 further comprising the step of reordering the buffered packets to assemble the encrypted message.

7. The method according to claim 1 further comprising the step of waiting for the explicit notification when required by a policy of the receiving node.

8. The method according to claim 1 wherein the message authentication is a message authentication code (MAC).

9. The method according to claim 1 wherein the sending node is a client.

10. The method according to claim 1 wherein the receiving node is a server.

11. The method according to claim 1 wherein the third node is a switch.

12. The method according to claim 1 wherein the packets are TCP/IP packets.

13. A system for data transmission between a sending node to a receiving node via a third node in a network, the system comprising:
   a circuit for providing an encrypted message including a message authentication;
   a divider for fragmenting the encrypted message into a plurality of sections;
   a transmitter for forming a plurality of packets for transporting the plurality of the sections,
   each of the plurality of packets including a flag indicating a presence of the message authentication;
   means for establishing the data transmission of the plurality of packets between the sending node and the receiving node;
   a descriptor for decrypting a member of the plurality of sections;
   an authenticator for authenticating the member at the third node;
   a sender for sending an explicit notification to the receiving node; and
   a forwarder for forwarding the decrypted and authenticated member of the plurality of sections to the receiving node.

14. A computer product comprising:
   a memory having microcontroller-readable code embedded therein for providing a data transmission between a sending node and a receiving node via a third node in a network, said code comprising:
   code means for providing en encrypted message including a message authentication;
   code means for fragmenting the encrypted message into a plurality of sections;
   code means for forming a plurality of packets for transporting the plurality of the section,
   each of the plurality of packets including a flag indicating a presence of the message authentication;
   code means for establishing the data transmission of the plurality of packets between the sending node and the receiving node;
   code means for decrypting a member of the plurality of sections at the third node;
   code means for authenticating the member at the third node; code means for sending an explicit notification to the receiving node: and
   code means for forwarding the decrypted and authenticated member of the plurality of sections to the receiving node.

15. The system according to claim 13 wherein the plurality of packets is sent from the sending node to the receiving node in a pipeline mode.

16. The system according to claim 13 wherein the message authentication is a message authentication code (MAC).

17. The system according to claim 13 wherein the sending node is a client.

18. The system according to claim 13 wherein the receiving node is a server.

19. The system according to claim 13 wherein the third node is a switch.

20. The system according to claim 13 wherein the packets are TCP/IP packets.

* * * * *

UNITED STATES PATENT AND TRADEMARK OFFICE
CERTIFICATE OF CORRECTION

PATENT NO. : 7,181,616 B2
APPLICATION NO. : 10/012339
DATED : February 20, 2007
INVENTOR(S) : Diana M. Chapman Page 1 of 1

It is certified that error appears in the above-identified patent and that said Letters Patent is hereby corrected as shown below:

Column 3, line 43: delete "clalm" and insert --claim--

Column 4, line 26: delete "en" and insert --an--

Column 4, line 31: delete "section," and insert --sections;--

Signed and Sealed this

Third Day of July, 2007

JON W. DUDAS
*Director of the United States Patent and Trademark Office*